Patented Sept. 14, 1948

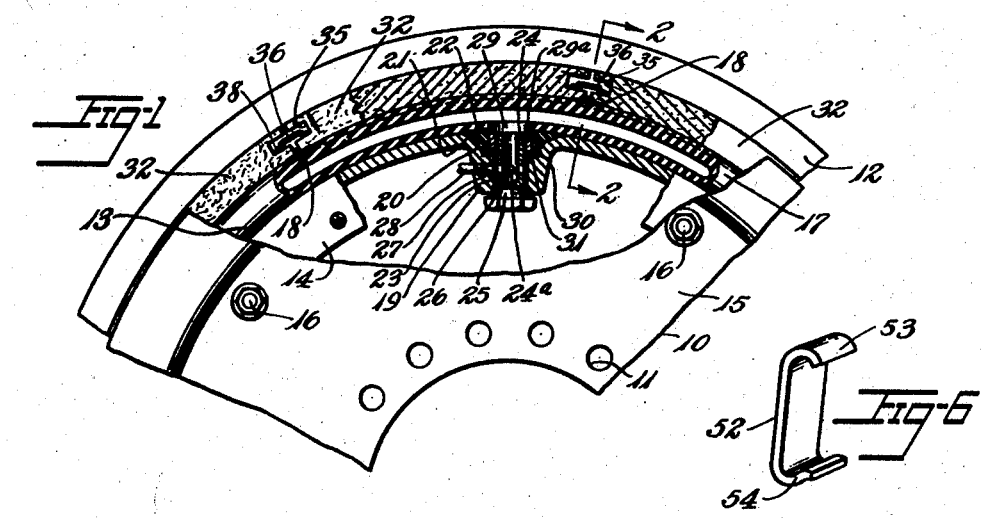
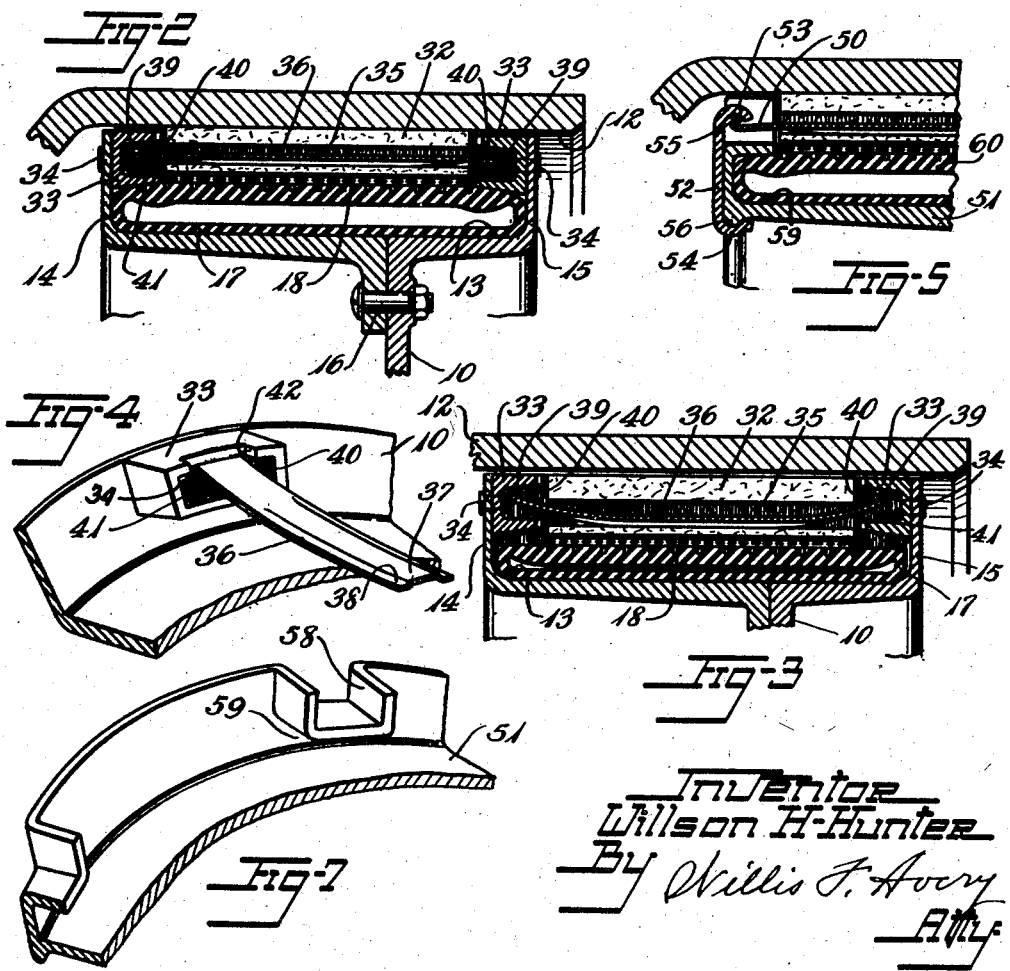

2,449,383

UNITED STATES PATENT OFFICE 2,449,383

BRAKE OR THE LIKE FRICTIONALLY ENGAGEABLE STRUCTURE

Willson H. Hunter, Akron, Ohio, assignor to The B. F. Goodrich Company, New York, N. Y., a corporation of New York Application October 28, 1943, Serial No. 508,038

6 Claims. (Cl. 188—152)

This invention relates to frictional mechanisms for rotatable bodies, such as brakes for the wheels of aircraft or other vehicles, and features of the invention are useful also in other mechanisms such as clutches operated by fluid pressure.

The principal objects of the invention are to provide for dependable application of power, to provide efficiency of operation, to provide for facility of maintenance, to provide a high degree of equalization in the distribution of frictional pressure, to provide protection of the expander tube against the effects of heat, to provide effective conforming action of the friction surface, to provide an improved connection of the expander tube to a source of pressure, to provide an improved construction and arrangement of the retractor springs and their relation with the friction blocks and supporting frame, to provide for a high degree of radial travel of the parts, and to provide longevity of the frictional mechanism.

These and further objects will become apparent from the following description and accompanying drawings in which:

Fig. 1 is a side elevation of the brake constructed in accordance with and embodying the invention, parts being broken away and in section.

Fig. 2 is a cross-sectional view taken along the line 2, 2 of Fig. 1 showing the brake parts in an expanded condition.

Fig. 3 is a view like Fig. 2 but showing the brake parts in a retracted condition.

Fig. 4 is a perspective view of parts of the brake.

Fig. 5 is a partial cross-sectional view of another embodiment.

Fig. 6 is a clip spring adapted for use in the embodiment in Fig. 5.

Fig. 7 is a perspective view illustrating the construction of the torque flange of the embodiment of Fig. 5.

Referring to the drawings in the embodiment of the invention in Figs. 1 to 4, a torque frame 10 may be fastened through holes 11 to a flange of a shaft (not shown). A rotatable brake drum 12 is located about the torque frame. The torque frame 10 is formed with a circumferential channel 13 which is defined by a fixed flange 15 at one side and a removable flange 14 at the other and fastened together by bolts 16. An annular expander tube 17 is seated within the channel 13, with its inner face in continuous contact therewith, and is adapted to force a frictional surface against the drum 12 when the tube 17 is inflated by fluid pressure.

To provide a fluid coupling between the expander tube 17 and a source of fluid pressure, a boss 19 is provided in the torque frame having a local depression 20 with dished walls 21 to receive a rubber nozzle 22 of the expander tube 17. A hole 23 is centrally located through the boss to the depression 20 at the inner periphery of the channel 13 to receive a hollow bolt 24. The bolt 24 has a tapered shoulder 25 to seat in a counter-sunk opening 26 of the hole 23. The diameter of the shank of the bolt 24 is somewhat smaller than the hole 23 to provide an opening between the shank and the hole 23. The bolt is closed at its lower end, except for radially extending apertures 24a. A hole 27 is provided in the boss 19 from the hole 23 to the outside wall of the boss to receive a connection pipe 28. By this arrangement of parts a communicating channel 29 is provided from the pipe 28, through the holes 27, 23, 24a, and the hollow shank to the expander tube 17.

The expander tube 17 is provided with a spud 29a embedded in the rubber nozzle 22 and bonded thereto by vulcanization with a substantial layer of rubber 30 between the spud 29a and the shoulder face 31 of the boss, so that as the bolt 24 is admitted to the hole 23 and turned into the spud 29a the layer of rubber 30 will be seated under compression and effect a fluid seal at the bottom of the depression 20, while at the same time a fluid seal is effected between the bolt 24 and the boss 19 at the shoulder 25.

This assembly provides a fluid and air-tight seal with a minimum number of parts, provides a snug fit of the nozzle into the recess provided in the torque frame, and provides a suitable tube anchorage against the frame, and at the same time leaves the nozzle somewhat flexible. This is desirable in that it provides some flexibility between the nozzle and the torque frame to allow minor displacement of the tube in the channel as it expands and contracts during the operation of the frictional mechanism.

Mounted in the channel 13 over the expander tube 17 are a plurality of friction blocks 32 formed of heat-resistant frictional composition, and disposed circumferentially around the annular channel 13. These blocks 32 are adapted to be forced into frictionable engagement with the drum 12 when the expander tube 17 is inflated by fluid pressure. To transmit torque from the blocks 32 to the torque frame 10, the blocks 32 are formed with their corners removed to receive rectangular torque lugs 33 fastened as by rivets 34 to the top edge of the circumferential margins of the torque frame 10. The margins of the tube 17 lie under these lugs as shown.

To retract the blocks 32 from the drum 12, to prevent radiation of heat from the brake drum to the expander tube, and to protect the expander tube from foreign matter, retractor springs 36 are provided. The blocks 32 are formed with axially extending grooves 35 in their adjoining margins to receive the springs 36, each of which engages the radially inner wall of each of the opposing grooves of consecutive blocks 32 and bridges the space between the blocks entirely above the expander tube 17.

Each spring 36, in leaf form, is formed with a transverse arch 37 extending lengthwise of the spring preferably throughout substantially the length of the grooves 35. The transverse arch is of such a shape as to have marginal flat areas 38 so that these areas 38 can contact the radially inner wall of each of the grooves 35 well into the groove. The spring 36 is more curved near its ends 39 beyond the transversely arched region than at such region so that while the more flattened areas 38 are in continuous contact with the axial grooves the flexing of the spring 36 can occur most effectively near the ends 39 when the spring is under strain. By virtue of this spring construction and arrangement, the friction blocks 32 move radially toward or away from the drum while maintaining substantial concentricity, so that as the expander tube applies pressure to the friction blocks, the pressure is transmitted equally over the areas of the blocks, and is equally relieved when pressure on the blocks is reduced. The ends 39 of the springs may be curved around toward the body of the spring and are so adapted to ride on the ramp 40 provided in a cavity 41 in the torque lugs 33 when the spring is flexed. The ramp surface 40 slopes toward the axis in the axially outward direction, which has the advantage that increased stiffness of the spring action is obtained as the spring slides along the ramp during braking action, and reduced tension on the spring is made possible at the start of its insertion into lugs 33, making for convenience in the assembly operations. A recess 42 is provided in the margin of the torque lug so that under extreme radial movement of the parts the lugs will not interfere with the springs.

A thin metal insert 18 may be placed between the lower faces of the adjacent blocks 32 and the expander tube 17 at the spaces as a further guard against radiated heat and further reduce the possibility of the expander tube's being locally deformed between the friction blocks 32. Thus the lugs 33 provide a means of positioning the friction blocks 32 around the channel and also a means of retaining the springs 36 in a torque free condition and the arrangement is such that a wide range of movement is made possible and thick blocks suitable for long wear may be utilized to advantage.

When pressure is applied to the expander tube 17 it engages the inner face of the friction blocks 32. As the friction blocks 32 move radially outward toward the brake drum 12, the retractor springs 36 are displaced upward causing the ends 39 to ride along the ramp 40 provided in the cavity 41 on the torque frame 10. This spring action results in strong spring resistance without the use of objectionably stiff springs, and this stiffening action is provided at a time when such additional stiffness is needed, namely when the plurality of brake blocks reach their position of maximum radial expansion to contact the drum 12.

When the pressure is released from the expander tube 17, the retractor springs 36 quickly release the friction blocks 32 from the drum 12 and return the blocks to the underlying channel.

In the embodiment of Figs. 5, 6 and 7 provision is made for connecting the leaf springs 50 to the torque frame 51 by the use of C-clips 52 provided with curved ends 53 and 54 as shown in Figs. 5 and 6 to engage respectively the curved end 55 of the leaf spring 50 and a beaded edge 56 of the torque frame 51.

U-shaped torque lugs 58 may be stamped or otherwise formed and extend inwardly at the outer periphery of the torque frame 51 so that a channel 59 lies beneath the lugs 58 to receive an expander tube 60.

In this arrangement the ends 55 of the retractor springs 50 may be displaced axially outward as radial pressure is delivered onto the body of the springs, thus causing the C-clip 52 to pivot about the edge of the torque frame 51, and making feasible a high degree of radial travel of the parts. This arrangement also facilitates installation and removal of the retractor springs without disturbing the other parts of the brake assembly.

Variations may be made without departing from the scope of the invention as it is defined by the following claims.

I claim:

1. A brake or the like frictionally engageable structure comprising a torque frame, an expander tube in said frame, a series of friction blocks at a face of said tube, bowed retractor springs bearing on said blocks and extending axially across said frame, and means on said frame for supporting the ends of said springs while accommodating change of length of the springs during flexure thereof, the last said means comprising C-shaped elements hooked about the ends of said springs and about portions of said frame.

2. A frictionally engageable structure comprising a torque frame having cavitied torque lugs, an expander tube adjacent thereto, frictional blocks having corners thereof recessed to receive said torque lugs to prevent rotative movement of said blocks relative to said frame, said blocks having grooves in the ends, retractor springs engaging walls of said grooves, said springs having longitudinally curled ends providing rounded bearing surfaces adapted to ride along walls of the cavities of said torque lugs as the springs are flexed under the expansion and contraction of said expander tube.

3. A brake or like frictionally engageable structure comprising a torque frame provided with torque lugs and having an annular channel, an annular expander tube in said channel, frictional elements having grooves in their ends and the corners removed therefrom adapted to move radially under fluid pressure from said expander tube, retractor springs formed with flat marginal edges along their central areas for reception in said grooves and having longitudinally curled ends providing rounded bearing surfaces adapted to ride against said torque lugs.

4. A brake or the like frictionally engageable structure comprising a torque frame, an expander tube in said frame, a series of friction blocks at a face of said tube, bowed retractor springs bearing on said blocks and extending axially across said frame, said springs having curled ends providing rounded bearing surfaces, and means on said frame for supporting the curled ends of said springs while accommodating change of length of the springs during flexure thereof, said means comprising elements pivotally connecting the curled ends of said springs to said frame.

5. A brake or the like frictionally engageable structure comprising a torque frame, an expander tube in said frame, a series of friction blocks at a face of said tube, bowed retractor springs bearing on said blocks and extending axially across said frame, said springs having curled ends providing rounded bearing surfaces, and means on said frame for supporting the curled ends of said springs while accommodating change of length of the springs during flexure thereof, said means comprising C-shaped elements hooked about the curled ends of said springs and about portions of said frame.

6. A brake or like frictionally engageable structure comprising a torque frame, a expander in said frame, a series of friction blocks at a face of said expander, bowed retractor springs bearing on said blocks and extending axially across said frame, said springs having ends curved longitudinally of the springs and relatively flat crosswise thereof for bearing upon said torque frame and having transversely arched intermediate portions relatively stiff as compared to said end portions for engaging said blocks, and means on said torque frame for supporting the ends of said springs.

WILLSON H. HUNTER.

REFERENCES CITED

The following references are of record in the file of this patent:

UNITED STATES PATENTS

| Number | Name | Date |
|---|---|---|
| 1,278,608 | DeLong | Sept. 10, 1918 |
| 1,519,759 | Crone | Dec. 16, 1924 |
| 1,527,831 | Borgner | Feb. 24, 1925 |
| 1,844,171 | Miller | Feb. 9, 1932 |
| 2,174,724 | Hunter | Oct. 3, 1939 |
| 2,185,250 | Frank | Jan. 2, 1940 |
| 2,243,229 | Tarris | May 27, 1941 |
| 2,349,494 | Fawick | May 23, 1944 |
| 2,350,038 | Hollerith | May 30, 1944 |